United States Patent [19]

McDonald

[11] 4,413,931

[45] Nov. 8, 1983

[54] METHOD FOR TREATING SUBTERRANEAN FORMATIONS

[75] Inventor: Roderick A. McDonald, Bothell, Wash.

[73] Assignee: Univar Corporation, Seattle, Wash.

[21] Appl. No.: 230,618

[22] Filed: Feb. 2, 1981

[51] Int. Cl.³ ...................... E02D 3/12; C09K 17/00
[52] U.S. Cl. .................................... 405/264; 166/295
[58] Field of Search ................ 405/263, 264; 166/280, 166/295

[56] References Cited

U.S. PATENT DOCUMENTS

| | | | |
|---|---|---|---|
| 3,026,938 | 3/1962 | Huitt et al. | 166/280 |
| 3,176,768 | 4/1965 | Brandt et al. | 166/295 |
| 3,193,011 | 7/1965 | Rickard | 166/295 |
| 3,297,089 | 1/1967 | Spain | 166/295 |
| 3,929,191 | 12/1975 | Graham et al. | 166/276 |

*Primary Examiner*—David H. Corbin
*Assistant Examiner*—Nancy J. Pistel
*Attorney, Agent, or Firm*—Christensen, O'Connor, Johnson & Kindness

[57] ABSTRACT

Subterranean geological formations such as those surrounding oil well bore holes, are treated by placing in or adjacent the formation a particulate material coated with a two-step, curable, novolac-type phenolic resin. The resin is thereafter cured in situ to bond the particulate matter together. In order to achieve desired compressive strengths, the resin must have an insolubility parameter of greater than about 1.0.

9 Claims, No Drawings

METHOD FOR TREATING SUBTERRANEAN FORMATIONS

BACKGROUND OF THE INVENTION

The present invention broadly relates to treatment of subterranean formations, especially those bearing hydrocarbons. More particularly, the present invention relates to a method of treating such formations with a particulate material coated with a phenolic resin.

Subterranean formations surrounding oil wells, gas wells, water wells, and other similar bore holes, are frequently treated with particulate materials in the form of sand or glass beads to alter the producing characteristics of the particular well. The type of treatments vary but can include hydraulic fracturing, sand consolidation, or gravel pack completion. All of these techniques, however, utilize particulate material that is injected into the well and into the geological formation surrounding and adjacent the bore hole. Commonly, the particulate material is coated with a thermosetting synthetic resin which is cured in situ in the formation to bond the particulate matter together once it is injected into the formation.

One thermosetting resin utilized in the past is a one-step, or resol, phenolic resin. Generally, the resol resin is coated or mulled onto particulated material such as well sand, either with or without the presence of a solvent. The coated sand is then injected into the well and thence into the geological formation surrounding the well. The resol resins are designed so that the heat naturally present in the geological formation is sufficient to cure the resin in situ in a period of from a few days up to 60 days or more. The resulting resin-bonded subterranean structure exhibits relatively high compressive strength and permeability, two characteristics that are required for effective treatment of subterranean formations.

Although well sand can be mulled with a resol resin when hot and in the absence of a solvent, the resulting coated resin becomes partially cured because of the required elevated mulling temperature and thus, when injected into a well, exhibits lower compressive strength and generally lesser permeability. It is therefore most desirable with resol resins to first dissolve them in a resin solvent and then coat the sand with the solvent-borne resin or to incorporate a solvent during the coating procedure. Mulling in the presence of a solvent, however, creates much longer mixing times than when mulling in the absence of a solvent.

Once sand is coated with a resol resin, it has a limited storage life. The resol resin tends to partially cure on the surface of the coated particles. Thus, when the resin is cured, in situ, the bond formed between particles is lower in strength. Furthermore, sands coated with solvent-borne resin tend to retain a small amount of solvent in the final product. The retained solvent gives the coated particles a sticky surface causing them to adhere to each other, thus preventing free flow of the particles when transferring them from one location to another and when injecting them into a bore hole. Lastly, solid resol resins require special manufacturing techniques, are harder to handle because they are inherently thermally unstable, and because the solid resols are constantly curing, the quality of the final cured resin is always unpredictable.

It has been suggested that two-step novolac-type phenolic resins be substituted for the one-step resol phenolic resins to cure some of these problems. Attempts to make this substitution, however, have always resulted in a coated sand having a lower compressive strength than that achievable with resol resins. Heretofore, it has been thought that the reduced strength of the conventional novolac resin-bonded sand was caused by the loss of polymerization catalyst hexamethylenetetramine (hexa) into the formation before the resin could cure. Increasing the amount of hexa in the uncured novolac has not, however, led to significant increases in compressive strength.

It is accordingly a broad object of the present invention to provide an adhesive for bonding particulate matter together in situ in subterranean formations, which adhesive has the favorable characteristics of one-step resol-type phenolic resins, but which does not exhibit the handling, short life, stability and mixing problems associated with resol-type resins. It is a further object of the present invention to define and identify a two-step novolac-type resin that has a compressive strength equal to that of the one-step resol-tyope resins when utilized in a subterranean formation to bond particulate matter together.

SUMMARY OF THE INVENTION

In accordance with the foregoing objects, and other objects that will become apparent to one of ordinary skill after reading the following specification, the present invention provides a method of treating a subterranean formation with a particulate material to enhance the characteristics of that subterranean formation for, for example, increasing its permeability and thus the productivity of a well situated in the formation. The method comprises placing a particulate material in or adjacent the formation. The particulate material is coated with a two-step, curable, novolac-type phenolic resin. The novolac resin is thereafter cured in situ in the formation. The cured resin bonds the particulate material together. In order for the resin to have the requisite compressive strength, it is necessary that it have an insolubility parameter (p) greater than 1.0. One resin presently preferred for performing the foregoing treatment method is a novolac resin having a majority of o-p' dimers.

DETAILED DESCRIPTION OF THE INVENTION

In accordance with the present invention, it has been found that the compressive strength of a novolac resin-bonded particulate material, especially when cured in an aqueous environment, is dependent not only upon the solubility of the resin, but also on its molecular weight before curing. In order to obtain the required compressive strengths for use in bonding particulate matter in subterranean formations, it is necessary for the novolac resin to have an insolubility parameter greater than about 1.0. The insolubility parameter is a measure of a given resin solubility corrected for its molecular weight. A method for determining the insolubility parameter of a given resin is set forth in detail below. If the insolubility parameter is less than 1.0, the resin will be entirely too soluble in the saline water and oil conditions encountered in subterranean formations. As a consequence, once particulate matter and a resin are emplaced in a subterranean formation, substantial amounts of the resin will be leached away, thus reducing the bonding strength between particles and accordingly reducing the overall compressive strength. Thus, it is critical for the resin to have an insolubility parameter greater than about 1.0.

Novolac resins of the type produced by reaction of an aldehyde with a phenolic compound are all generally operable in accordance with the present invention. Aldehydes having from 1 to 18 and preferably 1 to 6 carbon atoms can be employed. The phenolic compounds that can be employed include phenol, polyhydric phenols and substituted phenols such as alkyl, cycloalkyl, benzyl and halogenated phenols. A presently preferred resin is a basic phenolformaldehyde resin. All such resins are generically referred to herein as phenolic resins.

In accordance with the present invention, a the novolac resin with the requisite insolubility parameter is coated on the desired type of particulate matter. The coating technique utilized is normally referred to as mulling. This is a conventional technique utilized not only for well sands, but also for foundry sands and other similar materials. Normally, the novolac resin is first mulled with the sand until the sand particles are uniformly coated. At that point, the novolac catalyst, hexamethylenetetramine ("hexa") is added. The mixture is then mulled until the sand grains are uniformly coated with resin and the sand becomes free flowing.

The well sand or other particulate matter is then ready for transportation and/or storage. Because the resin is a novolac resin, it has a relatively long shelf life and can be stored for long periods of time. When ready for use, it is injected into a bore hole in accordance with conventional procedures. The heat of the subterranean formation into which it is injected is high enough so that the cross-linking reaction catalyzed by the hexa is initiated and runs to completion. Normally, it is expected that in the temperatures encountered in ordinary subterranean formations, for example, of the petroleum-bearing type, complete polymerization and thus maximum compressive strength are reached in on the order of 30 to 90 days after the material is injected into the formation.

It must be recognized that the subterranean formation treatment method, in accordance with the present invention, is usable for a variety of purposes, including the propping of well formations and hydraulic fracturing for increasing the permeability of formations surrounding bore holes. The coated particulate matter of the present invention is also suitable for use in conventional gravel packing treatment methods. Thus, the present invention has wide applicability to a variety of uses. It is not intended that the broad treatment method be limited to any one or even only the foregoing specific treatment techniques.

The insolubility parameter (p) for a novolac resin that will provide the unexpectedly increased compressive strengths when utilized in the treatment of a subterranean formation is determined by the formula $$P = \frac{100/S}{1.00428 + (0.000347929)(\overline{M}_w)} \quad (1)$$

wherein $\underline{S}$ is the solubility number for a given resin and wherein $\overline{M}_w$ is the weight average molecular weight of the resin. The weight average molecular weight of a given resin is determined by standard gel permeation chromatography procedures. The solubility number S is determined by the formula $$S = K\left[\left(\frac{100}{\% IPA}\right) - 1\right] \quad (2)$$

The %IPA volume (percent of isopropyl alcohol) is determined in the following manner. First, 200 milligrams of the given resin solids are first dissolved in 300 cc of an isopropyl alcohol-water mixture, adjusted to a pH less than 3 such that the amount of alcohol is just sufficient to produce a clear solution at 25° C. Maintaining the temperature at 25° C., a measured amount of distilled water is then added to the resin solution until a definite turbidity develops in the solution. The amount of water added is measured and the volume percent of isopropyl alcohol (%IPA) in the end solution is calculated by the following formula $$\% IPA = \frac{\text{volume of isopropyl alcohol in initial solution}}{300 + \text{volume water added}} \times 100 \quad (3)$$

K in Formula 2 is a constant that is related to the solubility number of a conventional acid-catalyzed novolac resin. For purposes of the present invention, a conventional acid-catalyzed novolac resin is one catalyzed by, for example, sulfuric, oxalic, or salicylic acids. Such a conventional novolac resin contains on the order of five to eleven percent o-o' dimer, 35 to 50% of o-p' dimer, and from 45 to 55% of p-p' dimer, based on total dimer content. K, for purposes of the present invention, is determined by calculating the solubility number ($S_c$) for a conventional acid-catalyzed resin in accordance with the following formula $$S_C = \frac{100}{0.909257 + (0.000303018)(\overline{M}_{wc})} \quad (4)$$

wherein $\overline{M}_{wc}$ is the weight average molecular weight of the conventional resin. $S_c$ is then substituted for the S value in Formula 2 above and a %IPA determination run on the conventional resin. K is then calculated. For purposes of the present invention, K can be given a value of about 53.85.

The insolubility parameter then is a molecular weight corrected number given an indication of the solubility of a given novolac resin relative to a conventional acid-catalyzed novolac resin. As stated above, those novolac resins having an insolubility parameter (p) greater than 1.0 will proivde the unexpected and desired results when utilized in accordance with the present invention. The higher the insolubility parameter (p) the less soluble that resin is and the better it will perform. Conversely, if the insolubility parameter of the resin is less than 1.0, the compressive strength of the resin will be far too low to be of any real value.

One resin having an insolubility parameter greater than 1.0 that can be utilized in accordance with the present invention is a resin having a majority of dimers that are o-p' or o-o', that is, one in which only a minority of the dimers are p-p'. Although the mix between o-p' and o-o' linkages will yield a satisfactory novolac resin to be used in accordance with the present invention, a greater proportion of o-p' linkages will provide a resin that has an improved compressive strength. A high compressive strength novolac resin to be utilized in accordance with the present invention can be produced in a two-step condensation reaction between phenol and formaldehyde. Such a resin produced by the two-step condensation reaction will hereinafter be referred to as the "hybrid" resin. The first condensation step is carried out by reacting phenol and formaldehyde in the presence of a strong acid catalyst. Preferably, the hybrid resin is produced by combining phenol, formaldehyde and the acid catalyst and heating the reactants and catalyst to a temperature of from 50° C. to reflux conditions (about 100° C.). In the first condensation step of the process, the number of moles of formaldehyde present is preferably less than or equal to one half the number of moles of phenol present. The first condensation step of the process is continued until a substantial portion, for example on the order of 99 mole percent, of the formaldehyde has reacted with the phenol to form an intermediate resin. Conventional acid catalysts found acceptable for purposes of the present invention include sulfuric acid, oxalic acid, salicylic acid, hydrochloric acid, phosphoric acid and p-toluene sulphonic acid. Other strong or weak acid catalysts known to the art for the acid-catalyzed, phenol-formaldehyde condensation reaction may also be utilized.

After a substantial portion of the formaldehyde added in the first condensation step of the process has reacted with phenol, the resulting intermediate resin is cooled. The pH of the intermediate resin is then adjusted upwardly to a pH of from 3.0 to about 7.0 and preferably to a pH of on the order of 5.0 to 6.0. The pH can be adjusted by the addition of a base, such as calcium hydroxide, in an amount effective to raise the pH to the aforementioned values. The second condensation step of the two-step reaction is then initiated by addition to the intermediate resin of additional formaldehyde and an orthodirecting catalyst (a catalyst that promotes the formation o-o' dimers in the phenol-formaldehyde condensation reaction). The total number of moles of formaldehyde added in the first and second steps of the reaction must be less than the total number of moles of phenol in order to produce the hybrid novolac resin. The ortho-directing catalyst can be any of a variety selected from acid salts of electropositive bivalent metals. Suitable ortho-directing catalysts include zinc, manganese, magnesium, cadmium and cobalt ions.

The resulting mixture of intermediate resin, additional formaldehyde and the ortho-directing catalyst is preferably heated to reflux conditions (about 100° C.) until a major portion of the additional formaldehyde reacts with the remaining unreacted phenol. The resulting mixture is then distilled under atmospheric pressure until the boiling temperature rises to the range of from 115° C. to 150° C., and preferably from 125° C. to 150° C. The mixture is then held at reflux conditions at a temperature in the range of from 110° C. to 145° C. until the condensation reaction is complete. For present purposes, the reaction is complete when there is no increase in molecular weight of the product as determined by standard test methods. The resulting product is the hybrid resin, which can be dissolved in a conventional organic solvent with water to form a liquid hybrid resin. Alternatively, the resulting product can be distilled to remove residual monomer and water and then cooled to form a solid hybrid resin.

The foregoing procedure can be modified in several ways, while still yielding the hybrid resin for use with the present invention. For example, in the first step of the reaction, the phenol and formaldehyde can be present in the desired molar ratio of the final product. The first step of the reaction is then terminated by cooling the reactants and adjusting the pH to the ranges described above when only a portion of the formaldehyde has reacted with the phenol. After the pH is adjusted, the ortho-directing catalyst is added and the second step of the reaction is initiated without the addition of phenol or formaldehyde. Alternatively, formaldehyde can be initially reacted with phenol in molar ratios of 0.6:1 to 0.85:1 formaldehyde to phenol and the first step of the reaction allowed to run to completion to form the intermediate resin. After the pH of the intermediate resin is adjusted to the ranges described above, additional phenol and formaldehyde can be combined with the intermediate resin, after which the second step of the reaction can be initiated.

A resin prepared in accordance with the foregoing method will have the requisite insolubility parameter greater than 1.0 and will contain a majority of o-o' and o-p' dimers. The resin will thus yield the superior and unexpected results provided in accordance with the present invention. It is to be understood, however, that any other novolac resin having the requisite insolubility parameter regardless of the distribution of dimers is also operable within the purview of the invention.

The novolac resin can be coated on particulate matter such as sand in a weight ratio of up to about 10% by weight of resin based on the total weight of particulate matter and resin. It is preferred, however that slightly less resin and preferably from about three percent to eight percent by weight of the novolac resin be employed. Although sand is a generally preferred particulate material for subterranean formation treatment in accordance with the present invention, other materials such as glass beads and aluminum pellets can also be employed.

As with prior resol resins, the addition of an organosilicon compound to the mull, that is, the combined particulate matter and resin, will normally improve the bond between the particulate matter and the resin. One preferred organosilicon coupling agent is an organofunctional silane such as aminoalkylsilane. Another silane that will give an improved bond is gamma-aminopropyltriethoxysilane. Other organosilicon compounds can be selected in accordance with the published literature to provide the organosilicon compound best suited for a given resin.

Additionally, other conventional resin additives such as lubricants, salicylic acid, plasticizers, urea and the like, can be employed without departing from the scope of the present invention.

EXAMPLES

The following examples are intended to illustrate to one of ordinary skill in the art how to make and use the present invention. The examples are not intended in any manner to delimit the invention, but are intended as representative procedures for reproducing the resin-coated particulate material to be utilized in accordance with the present invention to treat subterranean structures.

The examples set forth compressive strength comparisons of conventional acid-catalyzed novolac resins having an insolubility parameter less than 1.0 with several other novolac resins having an insolubility parameter greater than 1.0. All of the resins employed in the following examples are available commercially or are prepared by known methods. Additionally, a procedure for preparing the hybrid resin is disclosed in the foregoing detailed description. Table I below sets forth the dimer distribution for several resins designated I through V. Resins I and II are conventional acid-catalyzed resins commercially available from Pacific Resins and Chemicals, Inc., Tacoma, Wash. under the respective product designations S-2125-A and S-3913-D. Resin III is referred to as a hybrid resin and is commercially available from Pacific Resins and Chemicals, Inc. under the product designation 3849-A. Resin IV is a commercially available resin having a high percentage of o-o' dimers and is commercially available from Pacific Resins and Chemicals, Inc. under the product designator S-1969-A. Resin V has a high percentage of o-p' dimers. Resin V is prepared via well known conventional procedures for producing a high number of o-p' dimer by reacting phenol with formalin to produce saligenin. The saligenin is then reacted with excess phenol under acid conditions to produce the high o-p' resin. The weight average molecular weight as determined by gel permeation chromatography of resin V was 3866. Its solubility number (S) was 36.276 and its insolubility parameter (p) was 1.174.

TABLE I

| Resin No. | Type | Distribution of Dimers (%) | | |
|---|---|---|---|---|
| | | o-o' | o-p' | p-p' |
| I | conventional acid-catalyzed | 8 | 42 | 50 |
| II | acid-catalyzed | 8 | 40 | 52 |
| III | hybrid | 17 | 47 | 36 |
| IV | high o-o' | 60 | 40 | 0 |
| V | high o-p' | 8 | 90 | 2 |

The solubility number (S) and the insolubility parameter (p) for each of the resins were determined in accordance with the procedure set forth above. The resin was then mulled in a Hobart mixture by adding 32.8 grams of resin to 800 grams of 10- to 20-mesh sand (available under the product designator UNIMIN (10-20) from Baker Sand Control of Houston, Tex. The resin and sand were then mixed for 45 seconds. Hexa and water in a total amount of 16.9 grams are then mixed until the sand grains are uniformly coated and free flowing. The mixture is then discharged and cooled. The amount of hexa added was varied from 10% to 15% to 20% based upon the resin present.

A second test on certain of the resins was conducted so that a silane could be added during the mull. An aminoalkoxysilane available under the product designator A-1100 from Union Carbide Company of New York, N.Y. was utilized. First, 0.87 grams of silane, 7.14 grams of isopropanol and 0.8 grams of water were first admixed. The resulting silane solution was then added to 800 grams of the sand and mixed at 150° to 160° until all of the solvent was removed from the mixture. The resin was then added and the procedure set forth above for admixture of resin and hexa in the absence of a silane was followed.

To determine compressive strengths, a test specimen is produced by packing a sample of the mulled sand into a cylindrical plastic shell having a height of 1½ inches. The sand is compacted and then covered with water. The test specimen and water are then raised to a temperature slightly below 100° F. and cooked at that temperature for five hours to cure the resin in the presence of water. The sample is then taken out of the plastic cylindrical shell and placed in a conventional Tinius-Olson compressive strength tester and compressed until broken. The force in pounds necessary to break the specimen is read from the tester and the compressive strength then calculated by dividing the breaking force by the cross-sectional area of the specimen.

Tables II, III, and IV set forth the solubility number, insolubility parameter, and compressive strength with and without silane, for various ones of the resins set forth in Table I. Table II sets forth data for resins to which 10% by weight of hexa was added. Table III sets forth data for resins combined with 15% by weight hexa. And Table IV sets forth data for resins combined with 20% by weight hexa.

TABLE II

| | (10% Hexa) | | |
|---|---|---|---|
| Resin | Solubility Number (S) | Insolubility Parameter (p) | Compressive Strength (psi) |
| I | 65.817 | .8935 | 164 |
| III | 56.612 | 1.0962 | 211 |
| V | 36.276 | 1.174 | 413 |

TABLE III

| | (15% Hexa) | | Compressive Strength (psi) | |
|---|---|---|---|---|
| Resin | Solubility Number (S) | Insolubility Parameter (p) | w/o silane | w/silane |
| II | 80.775 | .8925 | 68 | 885 |
| III | 56.612 | 1.0962 | 155 | 1146 |
| IV | 20.426 | 2.084 | 293 | 1067 |
| V | 36.276 | 1.174 | 302 | — |

TABLE IV

| | (20% Hexa) | | Compressive Strength (psi) | |
|---|---|---|---|---|
| Resin | Solubility Number (S) | Insolubility Parameter (p) | w/o silane | w/silane |
| I | 65.817 | .8935 | 78 | 378 |
| III | 56.612 | 1.0912 | 142 | 958 |

A comparison of the data set forth in Tables II through IV clearly indicates that the compressive strength of well sands coated with novolac resins catalyzed in the presence of a given amount of hexa and having an insolubility parameter greater than 1.0 is significantly higher than sands coated with novolac resins having an insolubility parameter less than 1.0.

The present invention has been described in relation to a preferred embodiment and alternatives thereto. One of ordinary skill, after reading the foregoing specification will be able to effect various alterations, substitutions of equivalents and other changes to the broad methods and techniques set forth herein. It is therefore intended that the scope of protection granted by Letters Patent hereon be limited only by the definition contained in the appended claims and equivalents thereof.

The embodiments of the invention in which an exclusive property or privilege is claimed are defined as follows:

1. A method for treating a subterranean formation comprising the steps of:
    placing in or adjacent said formation a particulate material coated with a two-step, curable, novolac resin comprising the reaction product of an aldehyde with a phenolic compound, and thereafter causing said resin to cure in said formation and thereby bonding said particulate material together, said resin havng an insolubility paramteter (p) greater than about 1.0.

2. The method of claim 1 wherein the majority of dimers in said resin are o-o' and o-p'.

3. The method of claim 2 wherein the relatively largest group of dimers in said resin comprises o-p' dimer.

4. The method of claim 1 wherein a minority of the dimers in said resin are p-p'.

5. The method of claim 1 wherein said resin comprises up to about ten percent by weight of the combined resin and particulate material.

6. The method of claim 4 wherein said resin is present in an amount in the combined resin and particulate material of from about three percent to about eight percent by weight based on the total amount of material.

7. The method of claim 1 wherein said particulate material comprises sand.

8. The method of claim 1 wherein said particulate material further comprises an organosilicon coupling agent.

9. The method of claim 8 wherein said coupling agent comprises an organo-functional silane coupling agent.

* * * * *

UNITED STATES PATENT AND TRADEMARK OFFICE
CERTIFICATE OF CORRECTION

PATENT NO. : 4,413,931
DATED : February 2, 1981
INVENTOR(S) : Roderick A. McDonald It is certified that error appears in the above-identified patent and that said Letters Patent is hereby corrected as shown below:

| | |
|---|---|
| Column 2, | line 21, "tyope" should be --type-- |
| Column 3, | line 15, delete "a" |
| Column 4, | line 47, "given" should be --giving-- |
| Column 4, | line 51, "proivde" should be --provide-- |
| Column 5, | line 35, "orthodirecting" should be --ortho-directing-- |
| Column 7, | line 14, "well known" should be --well-known-- |
| Column 7, | line 16, "dimer" should be --dimers-- |

Cover Page:

In the Assignee Designation   "Univar Corporation, Seattle, Washington" should be
--Georgia-Pacific Corporation
Atlanta, Georgia--

Signed and Sealed this

Tenth Day of April 1984

[SEAL]

Attest:

GERALD J. MOSSINGHOFF

Attesting Officer   Commissioner of Patents and Trademarks